Dec. 11, 1928.

O. J. SUNDSTRAND 1,694,803

ADDING AND LISTING MACHINE

Filed Aug. 15, 1921     4 Sheets-Sheet 1

Dec. 11, 1928.

O. J. SUNDSTRAND

ADDING AND LISTING MACHINE

Filed Aug. 15, 1921     4 Sheets-Sheet 2

1,694,803

Inventor
O. J. Sundstrand
By Miller Churchill Barker
Attys

Dec. 11, 1928.
O. J. SUNDSTRAND
ADDING AND LISTING MACHINE
Filed Aug. 15, 1921     4 Sheets-Sheet 3
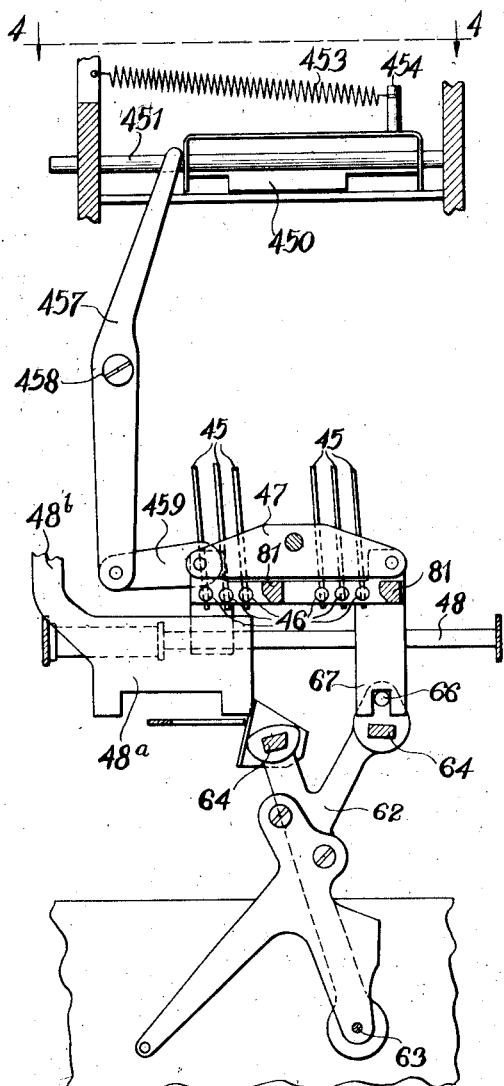
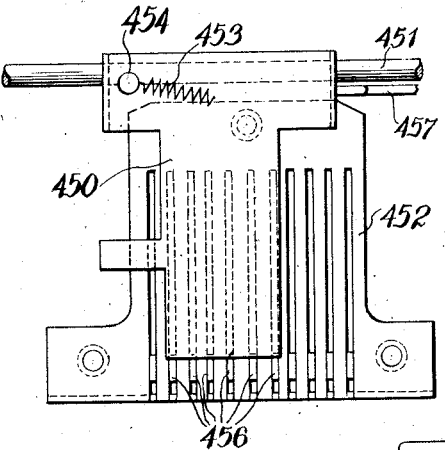
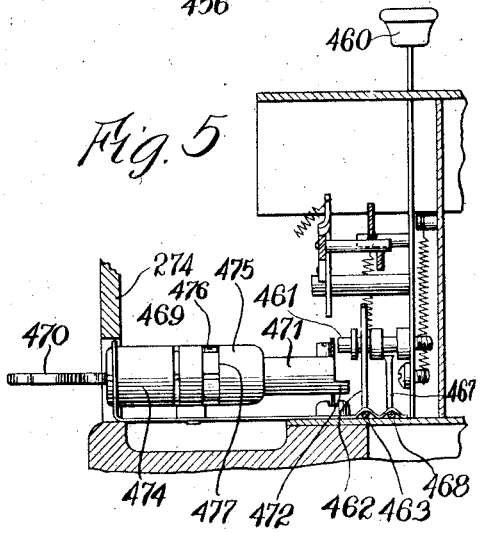
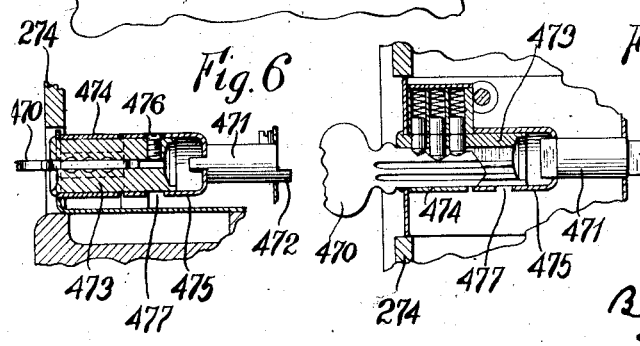

Dec. 11, 1928.

O. J. SUNDSTRAND

ADDING AND LISTING MACHINE

Filed Aug. 15, 1921   4 Sheets-Sheet 4

1,694,803

Inventor
O. J. Sundstrand
By Miller Chindahl Parker
Attys

Patented Dec. 11, 1928.

1,694,803

UNITED STATES PATENT OFFICE.

OSCAR J. SUNDSTRAND, OF ROCKFORD, ILLINOIS, ASSIGNOR, BY MESNE ASSIGNMENTS, TO SUNDSTRAND CORPORATION, OF WILMINGTON, DELAWARE, A CORPORATION OF DELAWARE.

ADDING AND LISTING MACHINE.

Application filed August 15, 1921. Serial No. 492,242.

Machines embodying the present invention are especially useful in retail stores where it is desirable to give each customer a slip showing the various items of his purchase, together with the total of the items, and to preserve a record of the items of all sales.

Certain machines now on the market are adapted to record items and totals upon two tapes wound face to face, the rear face of the top tape being carbonized. Portions of the upper tape are torn off and handed to the customers, the other tape being rewound in order to preserve a record of the items and totals. The total of the day's business can be obtained only by taking the rewound tape and adding up the totals shown on said tape, which operation obviously consumes considerable time.

The object of the present invention is to provide an adding and listing machine capable of producing customers' slips showing the items and total of a purchase, and a record for the proprietor's use of the items of all sales made during the day, without the necessity of using carbonized paper; to provide means whereby the total sales may be ascertained at the end of the day or at any other desired time by a simple operation of the machine; and to provide means to prevent any unauthorized person from operating the machine to ascertain the total sales.

Figure 1:
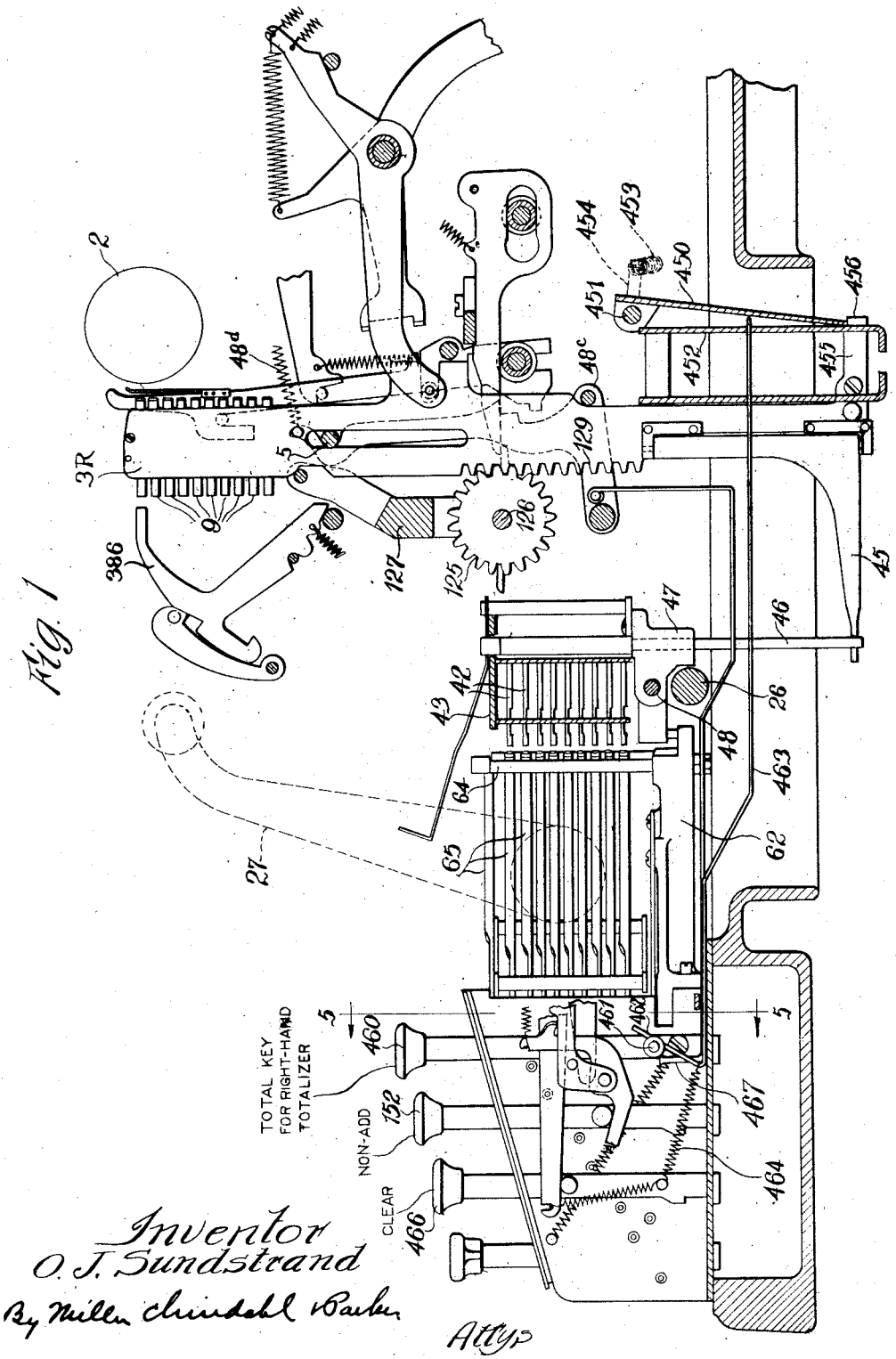
Figure 2:
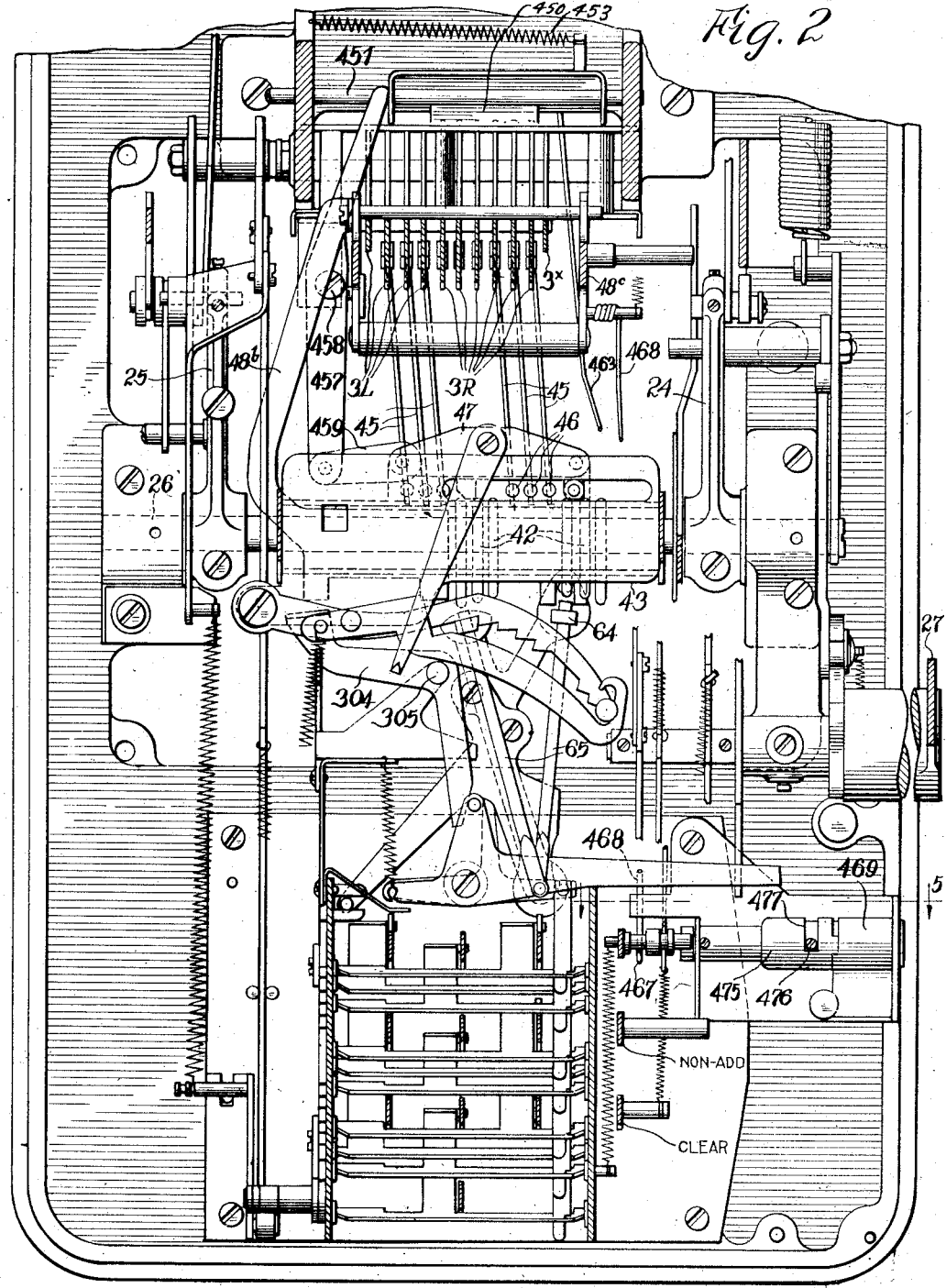
Figure 8:
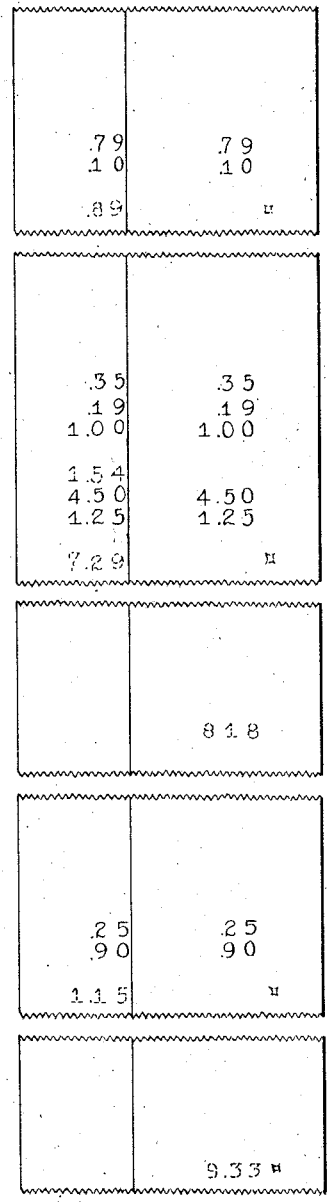
Figure 9:
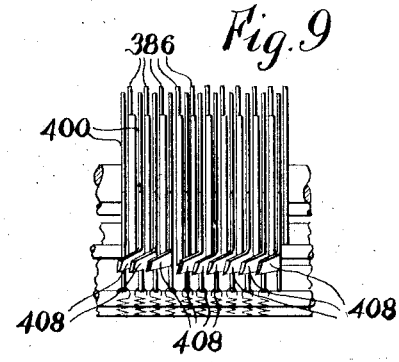
Figure 10:
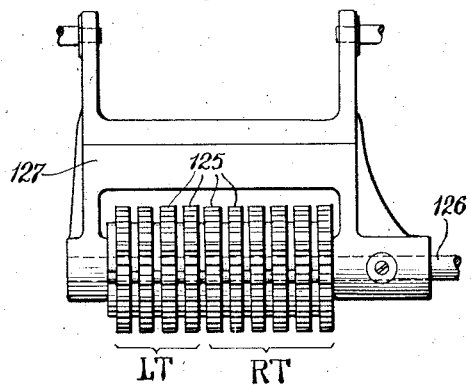

In the accompanying drawings Figure 1 is a fragmental longitudinal vertical sectional view of a machine embodying the features of my invention. Fig. 2 is a fragmental horizontal sectional view of the machine. Fig. 3 is a horizontal sectional view of a portion of the setting-up mechanism. Fig. 4 is a rear elevation, that is to say, a view taken in the plane of line 4—4 of Fig. 3. Fig. 5 is a vertical sectional view taken approximately in the plane of line 5—5 of Fig. 1 and line 5 of Fig. 2. Figs. 6 and 7 are detail views of a lock comprised in the machine. Fig. 8 is a facsimile of some printing done upon the machine. Fig. 9 is a fragmental front elevation of the hammer mechanism. Fig. 10 is a front elevation of the totalizers.

For convenience in imparting an understanding of the invention, the same will be herein described as embodied in a ten-key adding and listing machine substantially similar to the one shown in Patent No. 1,198,487 issued September 19, 1916, to Rockford Milling Machine Company upon an application filed by Gustaf David Sundstrand, but it should be clearly understood that the present invention is not limited to machines of the general character disclosed in said patent.

In a machine embodying this invention, the sheet or tape or tapes on which the items and totals are to be printed may be supported by any ordinary or suitable means, the only portion of such supporting means herein shown being a cylindrical platen 2.

The machine shown in the drawings comprises two sets of vertically reciprocable type bars, the left-hand set being adapted to print the items and the total of each sale, and the right-hand set being adapted to print the items of each sale and the total amount of all sales. In the present instance, there are four type bars in the left-hand set and six in the right-hand set, the machine therefore being capable of recording individual sales not exceeding $99.99 and of recording total sales not exceeding $9,999.99. It will be evident, however, that the invention may be embodied in a machine having a greater or smaller number of type bars.

The machine further comprises a left-hand totalizer operatively related to the left-hand group of type bars for adding the items of each sale, and a right-hand totalizer operatively associated with the right-hand set of type bars for adding all items introduced into the machine. Means is provided in conjunction with the left-hand totalizer for automatically obtaining totals, which means may be of any suitable character, as, for example, that disclosed in said Sundstrand patent. In connection with the right-hand totalizer there is a special key for obtaining totals. A clearing key is provided for clearing either or both totalizers.

The type bars of the left-hand group are designated $3^L$ in the drawings, while those of the right-hand group are marked $3^R$. One bar is provided for each numerical order. Each type bar supports at its upper end ten type-carrying plungers 9 adapted to print from "0" to "9", respectively. The top plunger is adapted to print "0", the next to the top "1", and so on.

The means for vertically moving each type bar into and out of printing position may be of any suitable construction, as, for example, that shown in said Sundstrand patent. 26 is the main rock shaft carrying two crank arms 24 and 25. The shaft 26 is arranged in any suitable manner to be rocked by means of a handle or crank 27.

The means for limiting the extent to which the type bars may rise and thus to determine which numerals shall be brought to the printing position comprises two groups of stops 42, one group for each set of type bars, each stop being horizontally slidable in a forward and back direction in a stationary guide frame 43. There is one vertical row or column of nine stops for each numerical order. When moved rearwardly from the position shown in Figs. 1 and 2 the rear portions of the stops are in the path of movement of devices carried by those type bars which are concerned in the printing of items (that is to say, all of the type bars of the left-hand group, and the right-hand three bars of the right-hand group) and thereby limit the upward movement of said bars. These devices consist of arms 45 pivoted to the lower portions of the type bars, and pins 46 having openings through which the arms 45 extend loosely. The pins 46 are guided for vertical movement in a slide 47 which is mounted on a stationary guide rod 48 extending transversely of the machine. The slide 47 is movable to carry the pins 46 from their normal or initial position at the left-hand side of the respective groups of stops 42 into vertical alinement with the columns of stops.

The type bars are normally in position to print ciphers. When a type bar is raised until its pin 46 stops against a projected stop 42 in the second horizontal row from the bottom, said bar is in position to print the numeral "1". The stops 42 in the third row from the bottom cause the printing of the numeral "2"; and so on. When the end of an arm 45 stops against the lower side of the slide 47 the type bar associated with said arm is in position to print the numeral "9".

Those type bars of the left-hand group which are not needed in printing a given item are prevented from rising when the handle 27 is pulled forward, by a detent plate 48ª guided to move in a horizontal plane, said plate being connected through a bar 48ᵇ to a frame 48ᶜ. The frame 48ᶜ is mounted to swing on the axis of a rod 5 (Fig. 1) and is normally impelled forward by springs 48ᵈ (only one of which is shown in the present drawings). When the slide 47 is in the initial position, as shown in the drawings, the detent plate 48ª is out of the vertical plane of the pins 46 of the left-hand group of type bars. The means herein shown for moving the plate 48ª rearwardly into the vertical plane of the pins 46 of the left-hand group of type bars is similar to that fully disclosed in my Patent No. 1,583,102, dated May 4, 1926, and hence need not be described herein in detail. It is sufficient to say that when a number key is depressed to set up the first digit of an item, the lever 304 (Fig. 2) is moved on its pivot 305, the rear arm of said lever engaging the plate 48ª and pushing it rearwardly. At every operation of a number key the slide 47 moves one step to the right, thus carrying the pins 46 successively out from beneath the detent plate 48ª.

Those type bars of the right-hand group which are not required in recording a given item are prevented from rising when the handle 27 is pulled forward, by means of a detent plate 450 which is slidably mounted upon a transverse guide rod 451. The lower edge of the plate 450 lies in contact with a slotted guide plate 452 forming part of the structure that guides the type bars during their vertical movement. The means for holding the plate 450 in contact with the plate 452 consists of a coiled contractile spring 453 connected at one end to a stud 454 on said plate and anchored at its other end to a suitable fixed point. Each type bar has a rearwardly extending portion 455 slidably engaging one of the slots in the plate 452. The portions 455 of the type bars 3ᴿ extend rearwardly of the plate 452 so as to constitute projections 456 (Fig. 1) which normally lie beneath the lower edge of the plate 450. A lever 457 pivoted at 458 has a rearwardly-extending arm which lies in contact with the plate 450 and thus restrains the spring 453. The forwardly-extending arm of the lever 457 is connected by means of a link 459 to the slide 47. It will be seen that when the slide 47 moves toward the right to carry one or more of the pins 46 successively into position to be controlled by the stops 42, the plate 450 moves toward the left to release one or more of the right-hand three type bars 3ᴿ so that said type bars may move upwardly to print the item when the handle 27 is operated. When the slide 47 is moved toward the left into initial position, the plate 450 is moved toward the right to its normal position.

The means for projecting the stops 42 into the vertical path of movement of the pins 46 comprises two groups of push pins 65, there being one such group of push pins for each group of stops 42. The rear ends of the push pins 65 are slidably supported in posts 64 fixed to a bracket 62 which is pivoted to swing in a horizontal plane on the center indicated at 63 in Fig. 3. The push pins 65 of each group are arranged in a vertical row or column and all except the uppermost push pin of the left-hand group are adapted to push the stops 42 out of the position shown in Fig. 1 and into the path of the upward movement of the pins 46.

The bracket 62 is caused to move in unison with the slide 47 by means of a pin 66 fixed to the bracket and lying within the bifurcation of a lug 67 on the slide. The slide 47 and the bracket 62 are moved to the right by the contractile spring 453. The spring is controlled by an escapement fully described in my said Patent No. 1,583,102, said escapement being operated by the uppermost push pin 65 of the left-hand group of push pins. The slide 47 and the bracket 62 are moved to the left into the initial position by any suitable means, as, for example, that fully disclosed in said Patent No. 1,583,102. In the movement of the slide 47 to the initial position, the stops 42 that had been set are pushed forward to the initial position by two bars 81 fixed to the slide 47, said bars having inclined faces which engage the stops.

The repeat key mechanism employed in the Sundstrand adding machine, may be provided, if desired.

The means for driving the type-carrying plungers 9 into contact with the inking ribbon may be similar to that embodied in the well-known Sundstrand adding machine or of any other suitable construction, and hence its construction and arrangement need not be disclosed herein in detail. The general construction of the hammer mechanism of the Sundstrand adding machine is explained in my Patent No. 1,626,889, dated May 3, 1927, to which reference may be made for a full understanding of its construction and operation. In the present drawings, 386 are the hammers and 400 the controlling levers. The means for effecting the release of the hammers that are to print ciphers comprises the usual lugs 408. It will be understood that the hammers for the left-hand group of type bars operate independently of the hammers for the right-hand set of type bars, and vice versa, there being no lug 408 on the controlling lever for the hammer which corresponds to the type bar $3^R$ that is nearest to the type bars $3^L$. (See Fig. 9).

As heretofore stated, the adding mechanism comprises two totalizers LT and RT (Fig. 10). Each totalizer consists of a series of adding pinions 125 rotatably mounted upon a shaft 126 which is carried by a pivoted frame 127. The pinions 125 (of which there is one for each type bar) are adapted to mesh with rack teeth 129 formed in said bars. When an item is to be added, the frame 127 is swung forward to disengage the pinions 125 from the racks 129 before the type bars are raised, and said frame is swung rearwardly just before the type bars are moved downwardly. Addition therefore occurs in the down-stroke of the type bars, the extent of rotation of the pinions depending, of course, upon the extent of movement of said bars.

It sometimes is desirable to print an item without adding it to the amount already accumulated. This may be accomplished by means such as that disclosed in said Sundstrand Patent No. 1,198,487, said means including a non-add key 152 and connections whereby the pinions stay out of mesh with the racks during the downward stroke of the type bars.

The carrying mechanism may be similar to that disclosed in said Sundstrand Patent No. 1,198,487 or of any other desired construction, and therefore its construction and operation will not be disclosed herein in detail.

When a total is to be printed, the pinions are retained in mesh with the racks during the upward movement of the type bars, as fully explained in said Sundstrand patent.

The means present in the well-known Sundstrand adding machine is employed to print subtotals from the left-hand totalizer LT automatically, that is to say, without the necessity of depressing a special key.

To obtain a total from the right-hand totalizer RT a special key 460 is provided. On the stem of said key is a stud 461 that bears against the inclined or cam portion 462 of a wire or rod 463 which is guided for reciprocation lengthwise of the machine. A coiled contractile spring 464 normally holds the rod 463 in its forward position. When said rod is slid rearwardly through depression of the total key 460, the rear end of the rod engages and swings the plate 450 far enough to the rear so that it is clear of the projections 456. The type bars of the right-hand totalizer are therefore free to rise when the handle 27 is pulled, said type bars rising to the extent permitted by the pinions of the right-hand totalizer, whereby the total accumulated in said totalizer is printed.

When it is not desired to clear the right-hand totalizer after printing a total, the pinions are allowed to remain in mesh with the racks during the downward or return movement of the latter.

When a grand total is to be taken from either totalizer, it is necessary to operate a clear key 466, this key and its connections to the swinging frame 127 being identical with the total key and connections employed in the well-known Sundstrand adding machine; or it may be of any other desired nature.

When a grand total is to be taken from the left-hand totalizer only, the clear key 466 is depressed, but the total key 460 is not operated, consequently the right-hand set of type bars is held stationary by the detent plate 450. By reason of the depression of the clear key 466, the totalizers are moved out of engagement with the racks after the completion of the up-stroke of the racks $3^L$ and before said racks descend, thus leaving all of the pinions of the left-hand totalizer standing at zero.

As will be understood, when a subtotal is to be taken from the right-hand totalizer, the total key 460 is depressed, but the clear key 466 is not operated.

When a grand total is to be taken from right-hand totalizer both of the keys 460 and 466 must be held depressed while the handle 27 is being pulled forward.

Means similar to that disclosed in my Patent No. 1,583,102, may be employed to compel a blank stroke of the handle 27 before taking a subtotal or a grand total from the left-hand totalizer.

To enforce a blank stroke of the handle 27 before taking a subtotal or a grand total from the right-hand totalizer, I provide a lock for the total key, said lock consisting, in the present embodiment, of the angular end portion 467 of a rod or wire 468. Said rod is mounted for forward and back movement, its rear end being attached to the frame 48°. When the detent plate 48ᵇ is in its rearward position (wherein it prevents the type bars 3ᴸ from rising) the frame 48° also is in its rearward position, and the angular end portion 467 stands directly beneath the stud 461 and prevents the total key 460 from being depressed. When, however, the detent plate 48ᵇ is in its forward position, (as it is after a blank stroke of the handle 27 has been taken) the lug 467 is out from under the stud 461, as shown in Figs. 1 and 2, and hence the total key 460 may be operated to take a subtotal or a final total from the right-hand totalizer.

Means has been provided to prevent the printing of totals from the right-hand totalizer by unauthorized persons. This means comprises a lock for preventing depression of the total key 460. While said lock may be of any suitable character, there is herein shown a lock 469 of the Yale type, one end of which is accessible from without the casing 27ᵃ for the insertion and removal of a key 470. The inner end of the lock cylinder has a lost-motion connection with one end of a shaft 471. On the other end of the shaft 471 is a lug 472. When the shaft 471 is in the position shown in Fig. 5, the lug 472 is below the lower limit of movement of the stud 461 and consequently does not prevent depression of the total key 460; but when the shaft 471 is turned through 180° from the position illustrated in said figure, the lug 472 lies directly below the stud 461 and prevents effective movement of the total key.

Inasmuch as the lock cylinder 473 makes a complete revolution, while the shaft 471 makes but half a revolution, a lost-motion connection between has been provided, as hereinbefore stated. 474 is the stationary lock casing and 475 is a rotatable casing connected to the shaft 471, there being interengaging stop shoulders on the casings 474 and 475 to limit rotation of the latter to half a revolution. 476 is a stop on the periphery of the cylinder 473, said stop lying within a slot 477 of approximately 180° in the casing 475.

If desired, any suitable means may be employed to print symbols indicating nonaccumulated items and clearing operations. Herein is provided a stationary type bar 3ˣ (Fig. 2) carrying a single type plunger. The imprint of said type plunger in black denotes non-added items, the same imprint in red indicating that the total which it accompanies is a final or grand total.

If desired, the machine may be mounted upon a desk or cabinet containing a cash drawer.

In Fig. 8 is shown a sample of work performed upon the machine. The printed records are illustrated as produced upon two tapes arranged side by side (that is to say, with the left-hand edge of one adjacent to the right-hand edge of the other) but it will be understood that a single tape longitudinally perforated so as virtually to constitute two tapes may be employed, if desired. The customer receives the portion of the left-hand tape containing the record of the items and the total of his purchase. The right-hand tape may be re-wound for preservation, or the salesman may tear off both tapes, hand the left-hand section to the customer and drop the right-hand slip through a slot into a compartment in the desk or cabinet upon which the machine is mounted.

After printing the items of a purchase, the salesman depresses the clear key 466 and pulls the handle 29, thereby printing the total accumulated in the left-hand totalizer and clearing said totalizer.

In certain lines of business the slip handed to the customer by the salesman is intended to be given to the cashier when making payment. It will be seen that the cash in the cashier's hands must agree with the total of the right-hand totalizer, and that the proprietor cannot be defrauded by collusion between the salesman and the cashier.

Whenever the proprietor wishes to take a subtotal, he operates the lock 469 for the total key 460, depresses said total key, pulls the handle 27, thereby printing the total contained in the right-hand totalizer without clearing said totalizer, removes the slip containing the total, and again locks the total key. At the close of business for the day the proprietor unlocks the total key 460, depresses said key, together with the clear key 466, and pulls the handle, thereby printing the total accumulated in the right-hand totalizer and clearing said totalizer. It will be apparent that no unauthorized person can ascertain the amount of business done.

It will be evident that the present invention effects a great improvement over the system employing two tapes, wound face to face, the top tape being carbonized. Instead of being obliged to take the record tape and add up the totals shown on said tape, the proprietor need simply depress the total key and the clear key and operate the handle of the machine. By obviating the necessity of using carbonized tape, a large saving is effected. The subtotals and final totals may be printed in a distinctive color, as indicated by the use of dotted characters in Fig. 8.

It will be seen that the machine herein disclosed contains two differential mechanisms (i. e., the two groups of stops 42, etc.) arranged to be set by a single keyboard.

In the present embodiment of the machine, each type bar is integral with its actuating rack, but obviously such a construction is not of the essence of the invention. In certain of the following claims I have used the term "actuator" to denote a rack or a type bar.

I claim as my invention:

1. An adding and listing machine having, in combination, two groups of type bars, each type bar having a movable stop portion, two stationary groups of stops arranged in series representing numerical orders, a single keyboard and connections for simultaneously setting stops in both groups of stops, and means for moving said movable stop portions transversely of the series of stops into operative alinement with the said stops.

2. An adding and listing machine having, in combination, two stationary groups of stops, two sets of push pins, means to cause both sets of push pins to swing as a unit across the groups of stops, and a single keyboard and connections for actuating the push pins to set the stops.

3. An adding and listing machine having, in combination, two stationary groups of stops, two sets of push pins mounted to swing on a common axis, means for swinging the free ends of said push pins into position adjacent the various stops, and a single keyboard and connections for actuating said push pins to set the stops.

4. An adding and listing machine having, in combination, two groups of vertically movable actuators, each actuator having a pivoted stop portion, two groups of stops, means for simultaneously moving said stop portions step by step into operative alinement with said stops, means for simultaneously setting stops in both groups of stops, a detent plate to prevent movement of the actuators composing one of said groups of actuators, the stop portions of the actuators of said group moving successively out of operative relation with said detent plate as said stop portions are moved step by step into alinement with the stops, each of the actuators of the other group having a projection, and a pivoted detent plate the lower edge of which is arranged to engage said projections to prevent movement of the last mentioned actuators, said pivoted detent plate being movable edgewise step by step to release the last mentioned actuators as said movable stop portions are moved into alignment with said stops.

5. An adding and listing machine having, in combination, two groups of actuators, each actuator having a pivoted stop portion, two groups of stops, means for simultaneously moving said stop portions step by step into operative alinement with said stops, means for setting the stops, a detent plate to prevent movement of the actuators composing one of said groups, the stop portions of the actuators of said group moving successively out of operative relation with said detent plate as said stop portions are moved step by step into alinement with the stops, each of the actuators of the other group having a projection, and a second detent plate arranged to engage said projections to prevent movement of the last mentioned actuators, said second detent plate being movable step by step to release the last mentioned actuators as said movable stop portions are moved into alinement with said stops.

6. An adding and listing machine having, in combination, a plurality of vertically movable actuators each having a forwardly extending movable stop portion, a stationary group of stops in front of the actuators, means for setting the stops, means for moving said movable stop portions step by step into operative alinement with said stops, each of said actuators having a rearward projection, a pivoted detent plate behind the actuators the lower edge of which plate is arranged to engage said projections to prevent rising movement of said actuators, said plate being movable edgewise step by step to release the actuators successively as said movable stop portions are moved into alinement with the stops, and means for swinging said plate to move its lower edge out of engagement with said projections.

7. An adding and listing machine having, in combination, two stationary groups of stops, a pivoted bracket, a plurality of key-actuated levers, two stop-setting members connected to each lever, the free ends of said members being supported by said bracket, means for swinging said bracket to carry the free ends of said members into and out of operative relation to the various stops, two groups of actuators, each having a movable stop portion, and means connecting said stop portions to said bracket, whereby said stop portions are moved into operative alinement with the stops.

In testimony whereof, I have hereunto set my hand.

OSCAR J. SUNDSTRAND.